United States Patent
Godfrey et al.

(10) Patent No.: US 9,527,133 B2
(45) Date of Patent: Dec. 27, 2016

(54) FINE PARTICLES

(75) Inventors: Alastair Bryan Godfrey, Farnborough (GB); Adam Kong, Farnborough (GB)

(73) Assignee: INTRINSIQ MATERIALS LIMITED, Hampshire (GB)

( * ) Notice: Subject to any disclaimer, the term of this patent is extended or adjusted under 35 U.S.C. 154(b) by 1432 days.

(21) Appl. No.: 13/138,012

(22) PCT Filed: Dec. 24, 2009

(86) PCT No.: PCT/GB2009/002971
§ 371 (c)(1),
(2), (4) Date: Sep. 16, 2011

(87) PCT Pub. No.: WO2010/073021
PCT Pub. Date: Jul. 1, 2010

(65) Prior Publication Data
US 2012/0003392 A1    Jan. 5, 2012

(30) Foreign Application Priority Data

Dec. 24, 2008 (GB) .................................. 0823561.6
Jul. 31, 2009 (GB) .................................. 0913437.0

(51) Int. Cl.
*C23C 16/513* (2006.01)
*B22F 1/00* (2006.01)
(Continued)

(52) U.S. Cl.
CPC ........... *B22F 1/0018* (2013.01); *B22F 1/0062* (2013.01); *B22F 9/12* (2013.01); *B82Y 30/00* (2013.01);
(Continued)

(58) Field of Classification Search
CPC ......... B82Y 30/00; B82Y 40/00; B82Y 10/00; H05H 1/42; H05H 1/24; C23C 16/4417; C23C 16/4411; C23C 16/452; B05D 1/185; B05D 3/0254
(Continued)

(56) References Cited

U.S. PATENT DOCUMENTS 6,689,190 B2 * 2/2004 Pozarnsky ....................... 75/332
2003/0116228 A1   6/2003 Pozarnsky
(Continued)

FOREIGN PATENT DOCUMENTS

JP    2007 254841 A    10/2007    ................ B22F 9/14
WO   WO01/17671       3/2001    .............. B01J 19/08
(Continued)

OTHER PUBLICATIONS

Vollath, Dieter, "Plasma Synthesis of Nanopowders", Springer Science and Business Media B.V. 2008, pp. 30-57.*
(Continued)

*Primary Examiner* — Alexander Weddle
(74) *Attorney, Agent, or Firm* — Ohlandt, Greeley, Ruggiero & Perle, L.L.P.

(57) ABSTRACT

A fine particle comprising a core and a coating, wherein the coating comprises a substantially monomolecular layer of organic molecules. The fine particle being produced by a process comprising introducing a core material into a plasma stream, thereby vaporizing some or all of the core material; cooling the core material downstream from where the core material was introduced thereby creating particles of the core material; and coating the particles of the core material with organic molecules in an injection zone, wherein the injection zone is downstream of a region where the particles of core material are formed, or wherein the cooled particles of core material are coated with organic molecules in a (Continued)

coating chamber by applying a liquid coating material and/or a solution of coating material to the core material; where in the coating chamber is downstream of a region wherein the particles of core material are formed.

11 Claims, 15 Drawing Sheets

(51) Int. Cl.
*B22F 9/12* (2006.01)
*B82Y 30/00* (2011.01)

(52) U.S. Cl.
CPC ........ *B22F 2998/00* (2013.01); *B22F 2999/00* (2013.01)

(58) Field of Classification Search
USPC .............. 427/212, 220, 216, 446, 447, 448; 118/723 R
See application file for complete search history.

(56) References Cited

U.S. PATENT DOCUMENTS

2003/0143153 A1* 7/2003 Boulos et al. ............. 423/592.1
2008/0145553 A1* 6/2008 Boulos et al. ................ 427/447

FOREIGN PATENT DOCUMENTS

WO    WO2007/087708    8/2007
WO    WO2008/068154    6/2008   ............... B05D 5/00

OTHER PUBLICATIONS

The Free Dictionary, "Methyl methacrylate", 2003.*
Rozenberg et al., "Polymer-Assisted Fabrication of Nanoparticles and Nanocomposites", Prog. Polym. Sci., vol. 33, p. 40-112, 2008.*
Cao Qin et al. Plasma Sources Science and Technology, 16 (2007) 240-249.
Vollath, J. Nanopart. Res. (2008) 10: 39-57.

* cited by examiner

FINE PARTICLES

This patent Application is a US National Phase Patent Application from PCT Application No. PCT/GB2009/002971 filed Dec. 24, 2009 and claiming priority from Great Britain Patent Application Nos. 0823561.6 filed Dec. 24, 2008 and 0913437.0 filed Jul. 31, 2009.

FIELD OF THE INVENTION

The invention relates to fine particles, to an apparatus for use in this process, and to a process for preparing fine particles. In particular, the invention relates to fine particles comprising a core and coating, and to a process and apparatus for preparing these.

BACKGROUND OF THE INVENTION

A common problem in the preparation of fine particles is their tendency to agglomerate, this is generally believed to be as a result of their high surface area to volume ratio which causes the particles to have a relatively high surface energy. It has been speculated that the agglomeration could be as a result of electrostatic forces between the particles, cold sintering, or van der Waals interactions. The result of this agglomeration is that fine particles are generally found as clusters, platelets or strings of the fine particles, and not as isolated fine particulate matter.

It would be advantageous to provide fine particles which are not agglomerated as agglomeration reduces the surface area of a given mass of fine particles. This would provide systems where either less fine particulate matter would be required for use in surface chemistry applications, or the same mass of fine particles could be used, but faster reaction rates observed as a result of the larger surface area available for reaction or physical absorption. The above properties are of particular importance where the fine particles are being used as catalysts as it is the surface chemistry of the particles, and hence their surface energy, which promotes the reactions.

Further, un-agglomerated fine particles will disperse more efficiently in liquids, the resulting colloids having the properties of a "solution" of the fine particle, as though the particles were not merely suspended in the liquid, but dissolved therein. The ability to form such colloids enhances the ease and speed of reactions using the fine particles; as the particles can be intimately mixed with the reactants in solution. With agglomerated fine particles it is generally necessary to sonicate a suspension of the agglomerated fine particles, and often to add a dispersant, in order to produce a stable colloid. This places limitations upon the presentation of the fine particles to any medium with which they are to interact. As a result, the formation of liquid suspensions in this way can result in fine particles with altered surfaces, and reduced surface energy, making them less suitable for their intended application. As noted above, dispersants such as surfactants can be used to stabilise the suspensions, or to help the fine particles form coatings. The use of dispersants is undesirable as not only does their use increase the cost of the product, but the dispersant also acts to reduce the surface energy of the fine particles, retarding, reducing or degrading their utility in surface chemistry applications.

Where the particles are sintered, even sonication will be unlikely to separate the fine particles. The energy provided by ultrasound would be insufficient to break the bonds. Without being bound by theory, it is thought that sintering occurs just after fine particle formation, as a result of the high temperatures at which the particles are formed in plasma processes. Further sintering may be observed as the particles cool, even at or near ambient temperature due to the high surface energy of the fine particles before they are contaminated (for instance with air). It has been postulated that fine particles formed from a gaseous or plasma state may even form bonds or links as the particles are produced.

Another advantage of producing unagglomerated fine particles would be their ability to pass through fine membranes and filters in the same manner as many large molecules. For instance, it could be of use to produce a colloid of fine particles in which the fine particles can pass across a permeable membrane under osmotic pressure.

It would therefore be desirable to provide fine particles which do not significantly agglomerate or sinter and which are stable in their pure form, with substantially all of their surface energy intact. The fine particles of the invention and the process and apparatus for preparing these are intended to ameliorate one or more of the above problems.

SUMMARY OF INVENTION

In accordance with a first aspect of the invention there is therefore provided a fine particle comprising a core and a coating, wherein the coating comprises organic molecules. By fine particles is meant particles having a size of or less than a micron and generally in the order of 100 µm or less. Preferably the fine particles are nanoparticles, by nanoparticles is meant particles having nanometric dimensions, and nanoparticles may have, for example, dimensions in the order of a few nanometers to several hundred nanometers. Nanoparticles may be spherical or aspherical, and may also be known as a nanopowder or as a nanometric material. Advantageously, the fine particles lie in the size range 1 to 200 nm, more preferably in the range 5 to 100 nm and more preferably in the range 10 to 50 nm, often in the range 10 to 20 nm.

In some embodiments the fine particle of the invention is free from any internal contamination by sulphur, nitrogen, chlorine, carbon or hydrogen. By "internal contamination" is meant that the core does not contain any contaminants of this type. In some embodiments the core of the fine particle of the invention will be substantially free from contamination by substrates including contaminants selected from sulphur, nitrogen, chlorine, carbon, hydrogen and combinations thereof. In other embodiments the contaminants will be selected from sulphur, nitrogen, chlorine, carbon, hydrogen, fluorine, oxygen, acetates, formates, organic salts and combinations thereof. It is an advantage of the thermal plasma process of the invention that the core is pure when compared to prior art fine particles.

Known (wet chemistry) techniques for the preparation of fine particles give rise to cores containing low levels of contaminants, particularly where the core is metal containing and the chemical routes to prepare the fine particles employ metal salts. Accordingly, using the process of the invention it is possible to produce fine particles which are substantially free from such internal contamination.

By "substantially free" is meant that the fine particles of the invention contain in the range 0 to 100 ppb, often 0 to 50 ppb, in many examples 0 to 10 ppb, often 0 to 5 ppb of contaminant. Typically the contaminants will be selected from those listed above. It will generally be the case that the surface of the particle has a higher level of contaminants than the core of the particle, as particles which have been made by processes in accordance with the invention will be coated last by elements and compounds of lower boiling point as these condense after materials with higher boiling points.

Often the fine particle will comprise in the core and/or the coating a noble gas residue, often argon or helium. The noble gas residue will often be found in the core and results from inclusion in the structure of the fine particle samples of the carrier gas used in the plasma. Often in a sample of particles prepared the process of the invention, approximately 20 to 50% of particles will contain a noble gas residue.

In some examples the fine particle will be spherical. The fine particles of the invention, when made using a thermal plasma process such as that described in this application, are spherical to within the limits of detection. For instance, under SEM/TEM analysis the particles appear spherical. Without being bound by theory this is believed to be due to the enormous force exerted by the surface tension of the molten core material which, because of the tiny dimensions involved, have a very high surface to volume ratio. Accordingly, when compared to fine particles prepared using wet chemistry routes, the fine particles of the invention are of a more regular shape because they do not undergo the chemical wetting which occurs in wet chemistry synthetic routes and which reduces the surface energy of fine particles prepared using wet chemistry. In wet chemistry, chemical wetting reduces the thermodynamic driving force and so low energy surfaces (for instance partially flat surfaces) will form more easily as the surface tension is less of a factor in the determination of the shape of the particle. Further, the fine particles observed with wet chemistry techniques tend to be clusters of the first few molecules formed, rather than (as is the case with thermal plasma techniques) the fine particles cooling from a totally molten sphere.

In some embodiments it is desirable that the fine particle of the invention be one of a population of fine particles in which in the range 5 to 100%, often 10 to 75%, in some examples 25 to 50% of the fine particles demonstrate "crystal twinning" in their internal structure. By "crystal twinning" is meant that where there are dividing plains in the crystal structure of the core material of the fine particle, because the crystal structure has formed in two different directions in one sphere, the crystals are formed back-to-back. Such crystalline twinning effects occur because of the rapid speed of formation of the particles of core material in thermal plasma systems. Such structures would not be observed with wet chemistry fine particles as the high energy giving rise the crystal structures arises from the rapid speed of cooling and formation of the particles of core material occurring when thermal plasma techniques are used.

Alternatively, the fine particles may show signs of internal lattice defects of relatively high energy. High energy defects would also be absent in fine particles formed using a wet chemistry route as these particles form more slowly. It is the rapid condensation observed using thermal plasma processes as described herein which gives rise to the lattice defects. These could be observed using, for instance a high powered TEM.

In some examples the coating of the fine particle is attached exclusively to the particle itself without the presence or interference of any third element or compound. Accordingly, the fine particles of the invention may be exceptionally pure and this may arise where thermal plasma processes such as that of the invention are used to prepare the fine particles. This is because the particles are being prepared using a physical technique as opposed to a chemical technique and hence the number of contaminants present in the system is significantly reduced. Fine particles made using wet chemistry techniques, often include residues of the reagents and solvents used in their formation. Thermal plasma techniques use gaseous carriers instead of solvents.

It is desirable that the coating prevents agglomeration of each fine particle with other fine particles, the fine particles of the invention preferably need no separate stabilisation to prevent agglomeration or to stabilise any dispersion including the fine particles. The coating may also act as a gas barrier, retarding or preventing oxidation of the core. It has been found with elemental cores, such as metal cores, that the presence of the coating reduces the rate of oxidation to below 10%, possibly below 5% of that observed where the coating is absent. The coating may temporarily reduce surface energy by reducing the driving force for the surface to react with air and the like. Polar oxygen ions or oxygen may be, for example, kept at a distance by the polar coating.

In many examples of the invention, the fine particles will comprise a surface which is of single polarity. This uniformity of polarity causes the fine particles to repel one another by electrostatic repulsion, and in some examples also by steric hindrance, as a result agglomeration is prevented.

The core is preferably produced from a high surface energy material, this may be an element or a compound. Often the element will be a metal or metalloid, and the compound a metal oxide. By metalloid is meant a chemical element which is intermediate in properties between metals and non-metals, including boron, silicon, germanium, arsenic, antimony and tellurium. Where the core is a metal, it will most often be a transition metal or an alloy of a transition metal. The transition metal will often be selected from iron, nickel, copper, zinc, palladium, silver, cadmium, gold and alloys thereof. In some embodiments, the transition metal will comprise copper, often the transition metal will be copper alone. Aluminium, or aluminium oxide may also be used.

Historically a "clean" fine particulate copper has been very difficult to achieve, and almost impossible to achieve in a reliable, repeatable manner. The subject invention may have overcome this problem. Fine particulate copper, has applications in the printed electronics industry, where ink jet printing of a fine particle dispersion of the copper could be used by the printed electronics industry to prepare circuits. The fine particulate copper of the invention could be used in this way, optionally with some post-printing treatment to modify the copper conductivity.

Some prior art uses inks of fine particles for use in conducting circuits by different processes to the invention, which have high resistance and excessive temperatures to sinter them.

Whilst the coating may be partial, the coating is most effective in preventing agglomeration and/or oxidation where it substantially covers the core. In preferred examples the surface of the core is completely covered by the coating. The coating material is desirably a material which forms only low energy reversible bonds with the core. This provides for removal of the coating prior to use of the fine particles. Organic compounds have been found to work in this way, and hence these are generally used in the invention.

In many instances the organic molecules will comprise polar (or even charged) molecules. Polar organic molecules are often used as these easily form monolayers. It is particularly useful if the polar molecule is elongate, and the functional group conferring the polarity is at one end of the molecule (such as a long chain carboxylic acid or a straight chain thiol). Molecules of this structure form efficient monolayers. For the purposes of this invention the monolayer is preferably uniform in that all of the molecules are aligned with the overall positively charged ends (whether these are fully charge carrying or whether there is only a partial positive or negative charge as a result of the electronic properties of the atoms in the molecule) together on either the outer surface of the fine particle or the inner surface. Whether the positive or negative charge is on the outer surface of the fine particle will depend upon the nature of the core material. The coating therefore works to prevent agglomeration through the electrostatic repulsion of like charges on the surface of the fine particles.

A wide variety of organic molecules may be used, including surfactants. It is important to note that where surfactants are used, these are as a coating and not as a dispersant as has historically been their application in nanoparticle systems. As the skilled reader will be aware, surfactants are generally elongate organic molecules and are often charged, surfactants are therefore appropriate for use in forming the coatings of the invention for the reasons outlined above.

The polar molecules may be carboxylic acids, sulfates, alcohols, nitrates, phosphates, amines, amides, thiols and combinations thereof. In many examples the polar molecules will comprise a carboxylic acid, an amine, an amide, a thiol or a combination thereof. Where carboxylic acids are used, these will often be selected from stearic acid, oleic acid, lauric acid, myristic acid, palmitic acid, caprylic acid, linoleic acid or combinations thereof.

These carboxylic acids are generally preferred as they are non-toxic, of low boiling point which makes them easy to vaporise in thermal plasmas systems, and they produce weak bonding with metals. It is this weak bonding which provides for easy removal of the acid coating to expose the high surface energy surface of the core or easy substitution for alternative ligands where the core can usefully be functionalised for specific applications. These applications include the deposition of a coating or track which can be post-treated to make it connected and to improve conductivity; or as the catalyst in a cars catalytic converter where the heat of the exhaust acts to remove the coating and expose the reactive catalytic surface below. Of the carboxylic acids tested, oleic acid has been found to be particularly appropriate for use in the fine particles of the invention.

Thiols may also be used, in particular straight chain thiols such as the $C_{10}$-$C_{18}$ thiols. Polymeric compounds may also be used, in particular polymers with polar side chains such as PVP (polyvinylpyrrolidone). It has been found that PVP coatings are also particularly advantageous for use with the invention. The PVP adheres to the core material by co-ordination of the nitrogen and oxygen moieties.

The coating may substantially be a monolayer, a monolayer with areas of bilayer and/or trilayer or of multiple layers. By "layer" is meant a distinct area of coating one molecule thick, in a monolayer the molecules may be aligned substantially parallel to the surface of the core, or perpendicular, or at an angle in between. It will often be the case that the layer will be formed of molecules aligned substantially perpendicular to the surface of the core, such layers are often said to be of "forest" construction. It will generally be the case that the coating will be substantially monomolecular, the use of monolayer coatings reduces the amount of coating material required, provides minimal addition to the size of the fine particle, and ensures that the coating is relatively easy to remove.

The average thickness of the coating is likely to be in the region of 100-200 nm per layer, often the thickness of the coating layer will be in the region of 125-175 nm where there is a monolayer and 250-350 nm where the coating is a bilayer.

The fine particles may be dispersed in solution, and accordingly a second aspect of the invention relates to a colloidal dispersion comprising a dispersed phase and a continuous phase, wherein the dispersed phase comprises a multiplicity of fine particles according to the first aspect of the invention. The dispersions of the invention have been found to be stable at ambient temperature (in the range 20-25° C.) without the presence of dispersants for up to six-months at concentrations in the range 0.001-20 wt %, often in the range 0.01-5 wt %, in some examples in the range 0.5-2.0 wt % or 0.5-1.0 wt %.

The continuous phase may be any fluid in which the fine particles are insoluble, the fluid will typically be a liquid at ambient temperature and the liquid will typically be non-toxic, and of low boiling point, such as boiling point less than 100° C. The fluid will often be an organic solvent or water. Often the continuous phase will be ethyl acetate although isopropanol, and acetone are also sometimes used.

In accordance with a third aspect of the invention there is provided a process for the formation of fine particles comprising a core and a coating, wherein the coating comprises organic molecules; the process comprising: introducing a core material into a plasma stream thereby vaporising some or all of the core material; cooling the core material downstream from where the core material was introduced, thereby creating particles of the core material; coating particles of the core material with organic molecules in an injection zone; wherein the injection zone is downstream of a region where the particles of core material are formed. This process provides fine particles each comprising a core and a coating.

In a fourth aspect of the invention, there is provided a process for the formation of fine particles comprising a core and a coating, the process comprising:
  introducing a core material into a plasma stream thereby vaporising some or all of the core material;
  cooling the core material downstream from where the core material was introduced, thereby creating particles of the core material;
  coating particles of the core material with organic molecules in a coating chamber by applying a liquid or vapour coating material or a solution of coating material to the core material;
  wherein the coating chamber is downstream of a region where the particles of core material are formed.

The coating material may be liquid coating material.

Thermal plasma processes have a further distinct advantage over wet chemistry techniques for preparing fine particles as thermal plasma techniques can be easily scaled up for volume production.

As noted above, fine particles have a high surface energy and hence have a tendency to agglomerate. This is problematic when the fine particles have been prepared in a thermal plasma system as the high purity and hence high surface energy of the resulting particles can result in agglomeration at far lower temperatures than would be possible for bulk products. This can even result in sintering of the particles prior to quenching which causes problems with particle filtration and adhesion of particles to the apparatus (for instance the plasma chamber and exit pipe work). This is exacerbated as the clean surfaces of the fine particles directly after formation (i.e. before exposure to air begins the oxidation process) exhibit an increased tendency to bond, even at low temperatures. For this reason, fine particle production using thermal plasma processes has historically resulted in low product yields at the downstream filter (typically the product collection stage).

Without being bound by theory, it is believed that the high surface energy is as a result of the high surface to volume ratio of the fine particles and the fine particles of the invention have cores which retain this high energy, but which are protected from surface oxidation, agglomeration and sintering by the coating. It will be obvious to one skilled in the art that the thermodynamics of this large and highly reactive surface area represents a huge driving force that will release much energy when such fine particles agglomerate or coalesce.

In embodiments of the invention where the core material is coated using a liquid coating material in order to provide un-agglomerated coated particles, the liquid coating material may be a material which is in liquid form at the coating temperature, or a solution containing dissolved coating material. As used herein, the terms "liquid" and "solution" are to be given their ordinary meaning in the art. When being described in general terms, the liquid coating material and the solution of coating material will be referred to as a "liquid medium".

This method has the advantage of removing the possibility that coated particles may be gathered on the filter; instead these are collected from the liquid medium, separate from the collection point for uncoated particles. In addition, solution coating of the core material can provide for a greater control of the coating temperature and coating medium than "in-flight" methods where there is a risk that the coating material can be degraded if fed into a zone of the plasma flow-line which is too hot.

The core material is preferably added to the plasma stream in particulate form, even nanoparticulate form. The smaller the particles of core material are before plasma treatment, the smaller the resulting fine particles will be, and the smaller the distribution in particle size will be. The particles of core material may be produced using a variety of methods. Examples are ball-milling, deposition from a sol-gel or plasma deposition. Preferably, the particles are produced by a thermal plasma-based method and more preferably by a plasma-spray method. Plasma techniques are preferred because they are particularly suitable for forming nanoparticles having the desired physical properties.

The thermal plasma torch operates at a temperature in the range 5000° K-15,000° K. These temperatures are too high for coating the fine particles of core material as the coating material (if it did not decompose or burn) would form a compound with the core material. Therefore, the coating must occur downstream of the plasma torch, in a cooler region of the apparatus. As the coating material is injected into the apparatus in some embodiments, this region is known as the injection zone. The injection zone is typically cooled, any known cooling method may be used; however, in this invention cooling is often using a water jacket.

In embodiments of the invention where the coating material is injected into the apparatus, it is generally preferred that the coating step occurs in a part of the injection zone which is at a temperature slightly below the temperature where the coating material would decompose or pyrolyse. However, it is desirable that the coating material is injected into the injection zone at the closest point of proximity within the plasma stream to the point of formation of the particles of core material. This is the point where the temperature of the injection zone has fallen just below the decomposition/pyrolysis point of the coating material, any closer and the temperature would cause breakdown of the coating material, and coating would not occur. This may be where the temperature is 10° C. below the decomposition/pyrolysis point, often 5° C., 4° C., 3° C., 2° C., 1° C., 0.5° C., below the decomposition/pyrolysis point. It is preferred that the temperature is as high as possible as this allows the newly formed particles of core material to be coated as quickly as possible after formation. The sooner the fine particles of core material are coated, the less time there is for agglomeration/sintering of the particles to occur. The temperature of injection may be in the region 400° C.-700° C., in this temperature range many organic molecules are vaporised, but stable to the temperature applied. It is preferred that injection occur above at a temperature above the boiling point of the coating material.

Where possible, the particles of core material should be coated almost immediately on formation, often within 1 second, generally within 0.5 seconds, if possible within 0.1 seconds, 50 milliseconds, 10 milliseconds or 5 milliseconds of formation of the particles of core material.

Often the coating material will be carried into the apparatus in a gas stream, the gas acts as a carrier for the coating material allowing it to be contacted with the particles of core material in aerosol or vaporised form. The finer the spray of coating material, the more efficient and controllable the coating process and accordingly it is preferred that the coating material be carried either as a fine aerosol or in vaporised form. Vaporised form is preferred as interaction between different molecules of the coating material is at its minimum in this form.

It will be preferred for safety reasons that the gas is an inert gas such as a noble gas or nitrogen. Often argon will be used as the carrier gas because of its ready availability.

In many embodiments the inert gas stream is sprayed upwards towards the plasma torch, but does not contact the plasma torch. This is achieved by positioning the gas streams to bring the coating material into contact with the fine particles of core material at the highest possible temperature and as soon as possible after formation of the particles of core material.

In some examples the coating material is heated prior to injection. Heating the coating material reduces viscosity facilitating conversion into a fine spray.

Subsequent to coating the fine particles are recovered using organic solvents which are then evaporated from the particles. The resulting product is a free-flowing powder of fine particles of the invention. Alternatively, the removal of the organic solvent may be after the coating of a surface with the fine particles, in such examples solvent removal leaves a layer of fine particles on the surface. These may then be used, for instance, as a heterogeneous catalyst. The removal of the solvent will often be in a controlled atmosphere to prevent contamination of the surface.

In the fourth aspect of the invention, coating is achieved by coating the particles in a liquid medium. Coating in a liquid provides a practical temperature limit at which coating can occur (the boiling point of the medium), provides substantially completely un-agglomerated particles, and easy retrieval of the particles after formation.

The medium may comprise a variety of components; however, in one embodiment it will be a solution that will comprise a coating material and a solvent. In a second embodiment the medium will consist of a liquid coating, preferably without any dissolved solids, which itself may be one chemical or a mixture of chemicals to give optimal performance, including protection at a later stage from exposure to reactive gases including air, and facilitating removal of the coating when required. For this reason therefore the liquid medium may comprise a mixture of different chemicals, which may each be in solution or a liquid form (often a substantially pure liquid form) of a compound. Often the liquid comprises an organic chemical without any dissolved solids, often the liquid is "neat".

In some examples the liquid medium comprises more than one different liquid component without any dissolved solids, the liquid or combination of liquids may be substantially free of solvent (by which we mean less than 0.1% solvent). In some examples, the liquid medium comprises a combination of one or more liquids and a solution of one or more organic solids.

Where the liquid medium is a solution, the coating material will often be present in the range 0.5-10 w/w, often 3-7 w/w, in some cases around 5 w/w. The solution may be heated, to improve solubility, to reduce the time delay required between formation of the nanoparticles and the coating step and/or to reduce the cooling effect on the gas stream. Temperatures in the range 50-90° C. may be used, often 50-70° C., in some cases a temperature of around 60° C. (so in the range 55-65° C.) may be used.

In many examples, the solvent will be selected from water, water miscible solvents, and organic solvents. Often the solvent will be selected from water, alcohols, aromatic hydrophobic solvents and combinations thereof, in some examples the solvent is selected from water, ethanol, iso-propanol, toluene and combinations thereof. In some examples the solvent will be selected from water, ethanol, dichloromethane, hexane, cyclohexane, dimethylformamide or combinations thereof.

The liquid medium will be housed in the coating chamber. In this chamber, particles of the core material are carried to the solution in a gas stream and bubbled through the medium. It will be preferred for safety reasons that the gas is an inert gas such as a noble gas or nitrogen. Often argon will be used as the carrier gas because of its ready availability.

The bubbling of the gas stream containing the particles of core material is often facilitated by designing the coating chamber as a "liquid trap" such as would be known to the person skilled in the art. In such traps the carrier gas is released into the liquid medium below the surface of the liquid, and bubbles up through the coating solution or liquid coating material to be released at the surface. During the transit of the carrier gas through the liquid medium, the particles of core material are believed to be released from the gas, coated, and retained in the liquid medium. It can be useful to ensure that the gas is at a pressure above atmospheric pressure at the point of entry to the coating chamber, in this way the bubbling process can be facilitated. Optionally, a pump may also be present at a point beyond the coating chamber to draw the carrier gas which has passed through the liquid medium from the coating chamber, by reducing the atmospheric pressure above the surface of the liquid medium.

In many embodiments the particles of core material pass from the expansion chamber where they are formed, directly to the coating chamber where they are coated during the process of bubbling the particles through the liquid coating medium. Upon coating, the coated fine particles are retained in the liquid medium and the gas forming the gas stream recovered for reuse. Typically the recovered gas will be dried prior to reuse.

The particles coated in this way are substantially completely un-agglomerated by virtue of the coating providing a barrier which prevents sintering of the core material.

The particles may be recovered from the liquid medium using any conventional means such as filtration, solvent evaporation, magnetic separation centrifugation etc. as appropriate The resulting product is a free-flowing powder of fine particles.

In a fifth aspect of the invention, the process of the third aspect of the invention is carried out using an apparatus for the formation of fine particles comprising a core and a coating; the apparatus comprising a plasma stream with an injection zone between a plasma torch and a quenching zone; wherein a coating material is injected into a stream of particles passing through the injection zone from the plasma torch to the quenching zone.

In a sixth aspect of the invention, there is provided an apparatus for the formation of fine particles comprising a core and a coating; the apparatus comprising a plasma stream with a coating chamber downstream of the plasma stream; wherein a liquid or vapour medium of coating material is housed in the coating chamber and a gas or liquid stream containing particles of a core material is fed into the coating chamber.

A liquid medium of coating material may be used. A gas stream may contain particles of the core material.

The apparatus used in the invention is a combination of a commercially available and standard system for spraying materials using a plasma, with a water-cooled and atmosphere controlled system. The object of this combination is that it allows conversion of feedstock into nanosize material, using a low cost torch and allows use of an advanced power and control system that are widely available.

In the apparatus there is provided an assembly for attachment to a plasma torch for use in the conversion of material into nanoparticles, the assembly may comprise in some examples: a plasma torch section comprising a plasma torch; an inlet channel; and a feedstock injector, positioned to direct the feedstock into the inlet channel whereby in use the feedstock injector injects the feedstock into a plasma stream from the plasma torch; an expansion chamber; a further chamber downstream of the expansion chamber defining an injection zone, the injection zone optionally being connected via a coating injection point to a fluidising apparatus via an atomiser. Further chambers to cool and collect the particles may also be present.

It is often preferred that the coating material is fluid at a point of injection, often the coating material has been vaporised. In many embodiments, the coating material is at a temperature below but close to the temperature at which the coating material decomposes/pyrolyses at the point of injection.

It is useful if the injection zone comprises a plurality of injection points. This facilitates the introduction of the coating material from different points around the plasma stream. Further, as different coating materials will have different decomposition points, it is useful if the injection points are distributed along the length of the injection zone. This allows different coating materials to be injected at different temperatures.

In other examples, in the apparatus there is provided an assembly for attachment to a plasma torch for use in the conversion of material into nanoparticles, which may comprise: a plasma torch section comprising a plasma torch; an inlet channel; and a feedstock injector, positioned to direct the feedstock into the inlet channel whereby in use the feedstock injector injects the feedstock into a plasma stream from the plasma torch; an expansion chamber; a coating chamber downstream of the expansion chamber. Further chambers to cool and collect the particles and chambers to collect the gas forming the gas stream may also be present.

As described above, the injection of the coating material may be in an inert gas stream; it is preferred that the inert gas stream does not contact the plasma torch as the coating material carried therein would decompose or burn.

The fine particles of the invention have a wide variety of applications including but not limited to applications in catalysis, water filtration and biocides. The biocidal applications would primarily be the use of the inventive fine particles as antiviral agents, possibly as coatings on or components of hard surfaces. Further, the fine particles of the invention are sufficiently stable in solution that they can be printed using ink jet technology, providing applications in fields such as printed electronics.

The invention provides a composition for inkjet use comprising particles according to the invention. Use of the fine particles according to the invention in inkjet printing and technology is also provided.

It will be clear to the skilled reader that, unless otherwise stated, all parameters appearing in this application are to be taken as modified by the word 'about'. Additionally, unless otherwise stated each feature described in the application may be taken in combination with any other feature described in the application.

BRIEF DESCRIPTION OF THE DRAWINGS

Embodiments of the invention will now be described in detail by way of non-limiting example only with reference to the accompanying drawings in which:—

DETAILED DESCRIPTION OF THE INVENTION

Apparatus

Figure 1:
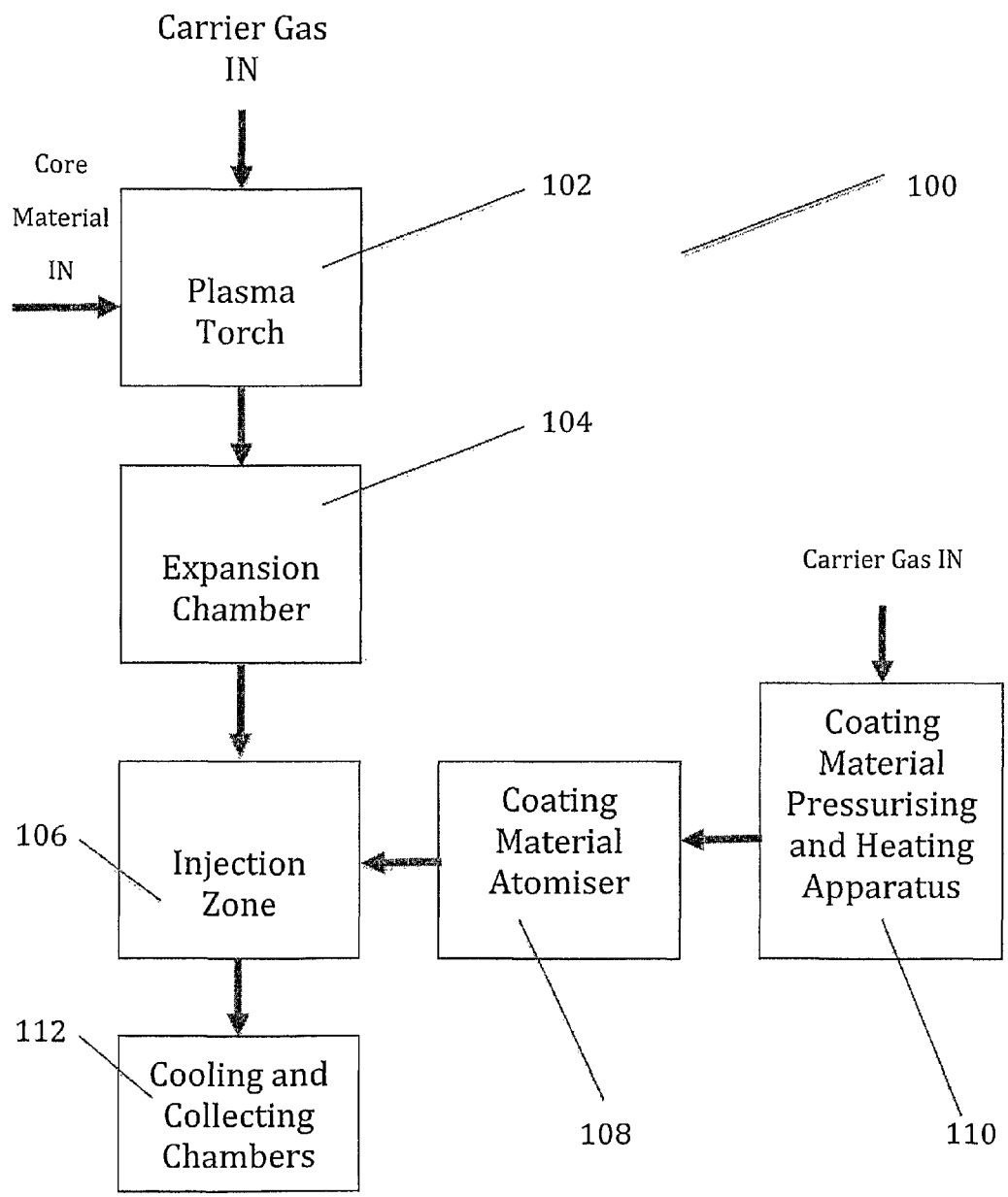
FIG. 1 is schematic diagram of the apparatus of the invention.
Figure 2:
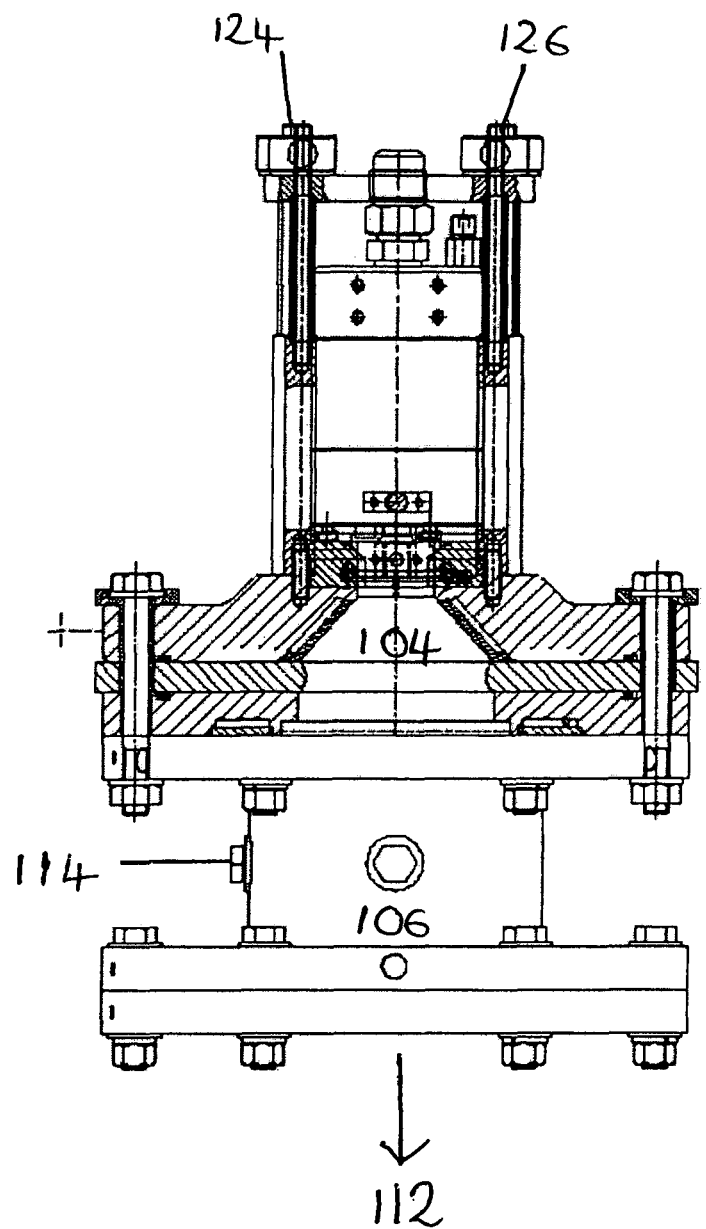
FIG. 2 is a is a side elevation of an embodiment of the apparatus attached to a known plasma torch.
Figure 16:
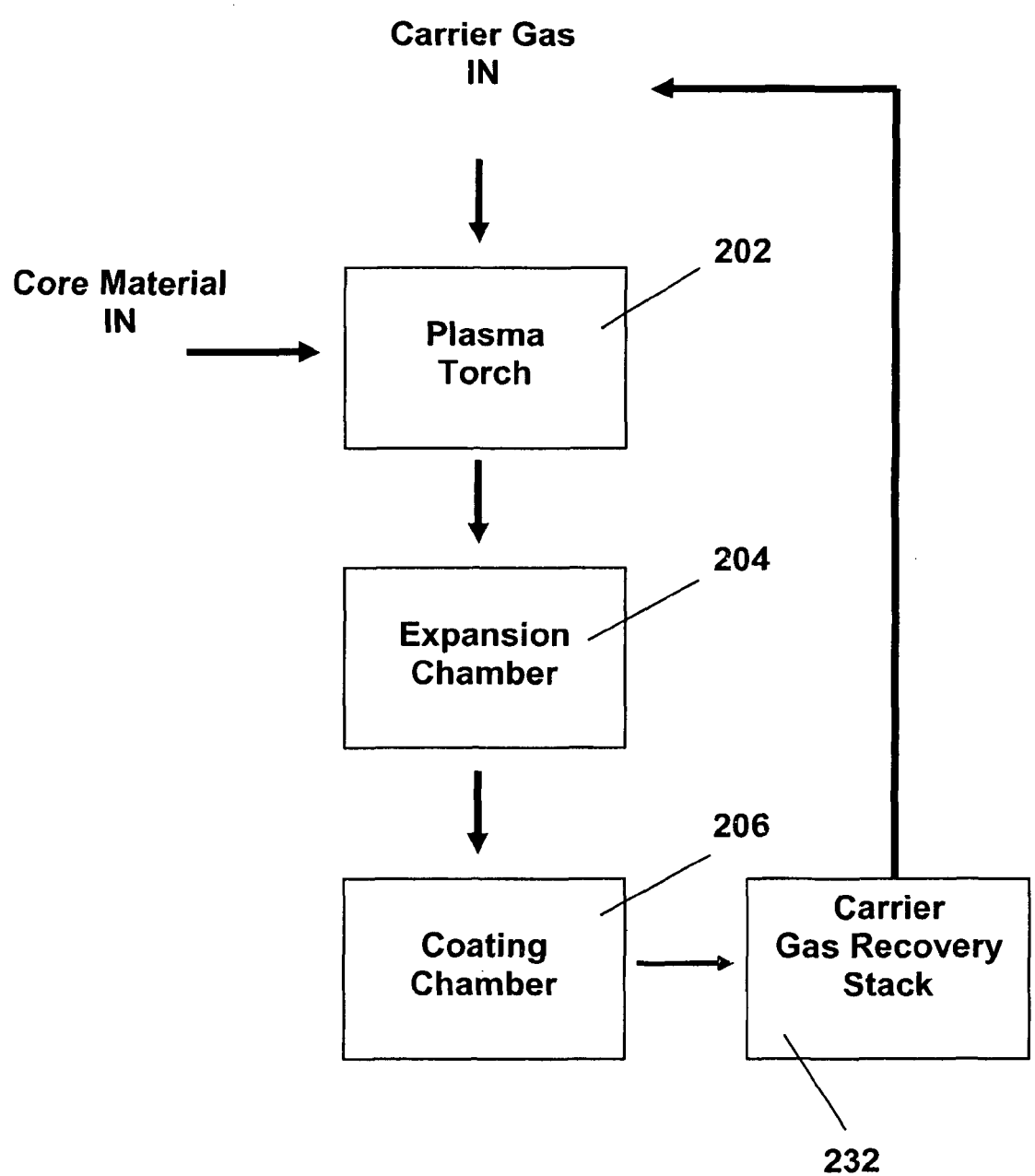
FIG. 16 is schematic diagram of the apparatus of the invention.

A modified thermal plasma apparatus 100, was used to generate fine particles in accordance with the invention. Representations of the apparatus 100, are shown in FIGS. 1, 2 and 16.

A plasma torch 102, 202 is positioned adjacent an inlet channel (not shown) and copper powder injected via the inlet channel into a plasma stream from the plasma torch 102, 202. The torch 102, 202 is connected to an expansion chamber 104, 204 which allows the copper to expand and cool. The particles of core material, in this example copper, are formed in the expansion chamber 104, 204. In the first example the particles flow from the expansion chamber 104, 204 to the injection zone 106, which includes an injection point 114. The coating material, in this example oleic acid, is supplied to the injection zone 106 from a coating material pressurising and heating apparatus (a fluidising apparatus) 110, via an atomiser. In this embodiment there are three injection points 114 (two only shown, the third injection point is to the rear of the apparatus). The fine particles then pass from the injection zone 106 to the cooling and collection chambers 112.

Figure 17:
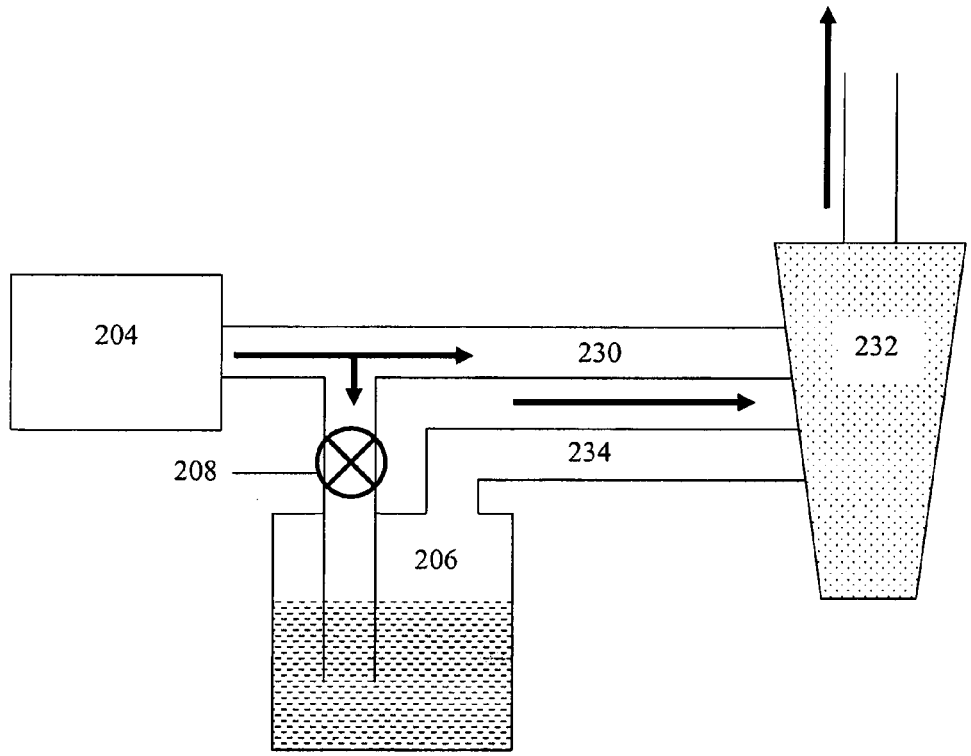
FIG. 17 is a schematic side elevation of a coating chamber.

In the second example the particles flow from the expansion chamber 104, 204 to the coating chamber 206 which includes a control valve 228 and bypass conduit 230 (FIG. 17). The coating material, in this example oleic acid, is supplied in aqueous solution in the coating chamber 206 at a concentration of 5% w/w, or in undiluted liquid form. 5% w/w. The fine particles are then retrieved and stored in collection chamber 112.

The plasma torch 102, 202 in the preferred embodiment is a known DC non-transferred arc torch. Other plasma torches or plasma spray torches may also be used. Gas, in this example a mixture of argon and helium, is passed between a cathode 124 and anode 126 where it is ionised and is turned into a plasma. In this embodiment the torch power is 30 kW and the flow rate of the argon/helium gas mixture is 72 liters/minute for the argon and 9 liters/minute for the helium. In further embodiments the argon gas contains up to 30% helium by volume, and/or hydrogen and/or a hydrocarbon gas such as methane or mixtures of these gases may also be used.

Preferably the plasma torch 102, 202 has a flow stabilisation means, such as a vortex flow stabiliser (not shown) to help define the path of the plasma stream. The plasma torch 102, 202 may also comprise a known powder feed system that is enabled to directly feed powdered material into the gas flow or into the arc of current that is created between the cathode 124 and anode 126. In the preferred embodiment the copper core material is fed into the plasma torch as a rate of 100 g/h and the rate of argon gas flow is approximately 50 to 80 l/min.

The expansion chamber 104, 204 of this example is frusto-conical. The expansion chamber 104, 204 must be cooled as this chamber 104, 204 is exposed to very high temperature plasmas, this begins the particle cooling process in which a temperature gradient is observed, the hottest region being the expansion chamber 104, 204, the coolest being the cooling chamber 112, where present the injection zone 106 is positioned in between. It is the combination of expansion and cooling which allows the particles of copper to form.

Figure 3:
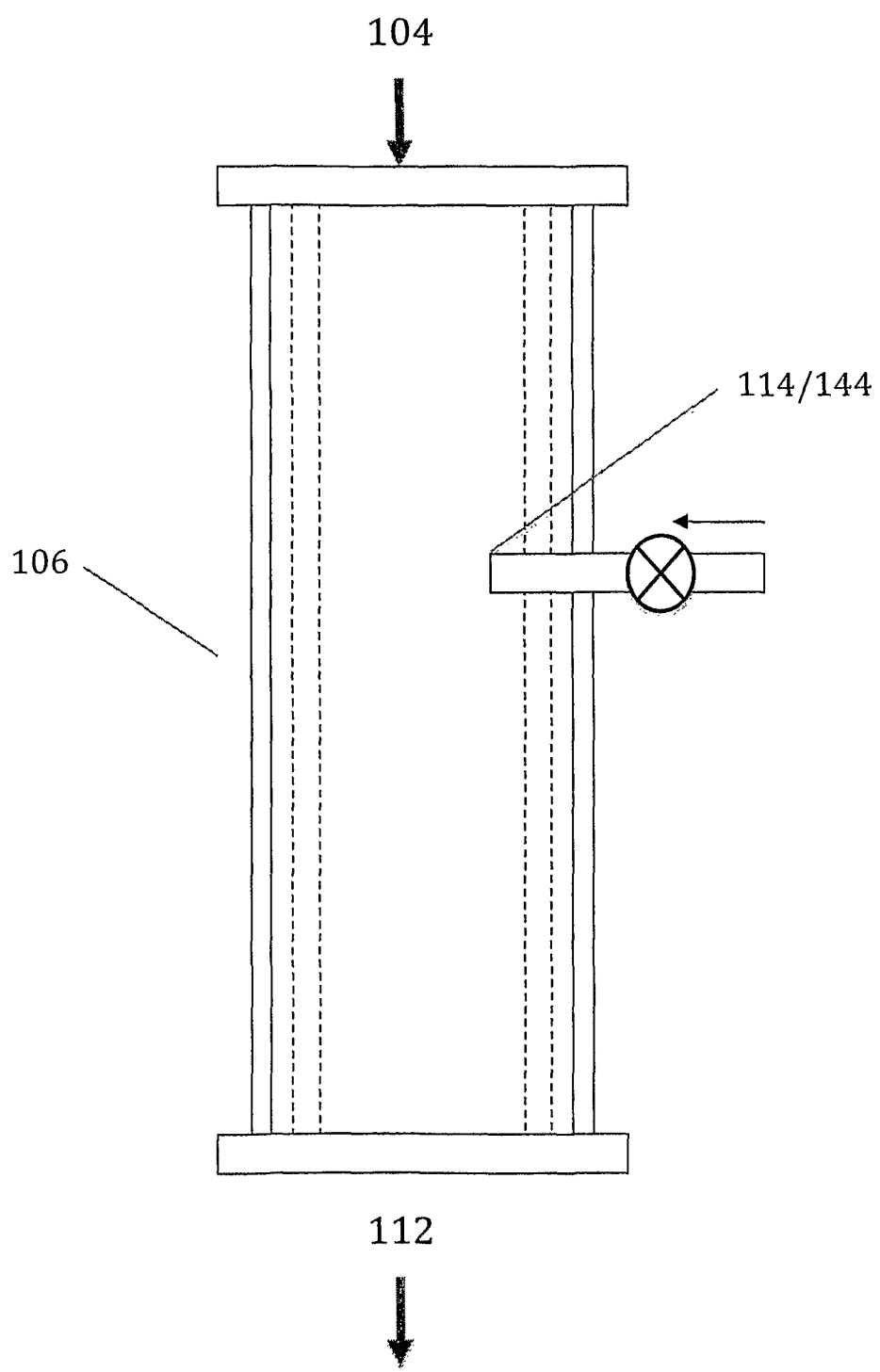
FIG. 3 is a schematic side elevation of an injection zone.

In some embodiments the copper particles then flow into the injection zone 106, where they are coated (FIG. 3). The injection zone 106 is cooled, in this example using a water jacket (not shown) including water circulating at a rate of 45 liters/minute. Thus a temperature gradient is created in the injection zone 106, the highest temperature region being adjacent to the expansion chamber 104.

Figure 4:
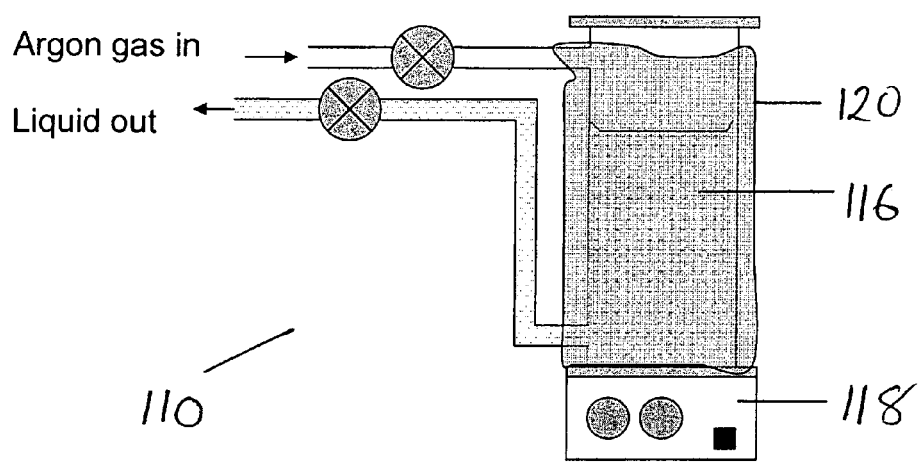
FIG. 4 is a side elevation of a pressurising and heating unit for the coating material.

In these embodiments the oleic acid is prepared for injection into this zone 106 in a pressurising and heating apparatus (FIG. 4). In this embodiment the apparatus comprises a stirred reservoir 120 of oleic acid which is heated to 73° C. (the boiling point of oleic acid is 360° C.) and pressurised to 4 bar (400 kPa). Where alternative coating materials are used, the skilled person would know to use alternative temperatures and pressures as necessary in order to reduce the viscosity of the coating material, but (in examples such as this) maintain this in liquid form prior to transfer to the atomiser. In this example the oleic acid is stored under an inert argon atmosphere. The pressurising and heating apparatus 110 is stirred using a conventional heating and stirring plate 118. The temperature in the reservoir 120 is also controlled by the presence of an insulating jacket 116.

Figure 5:
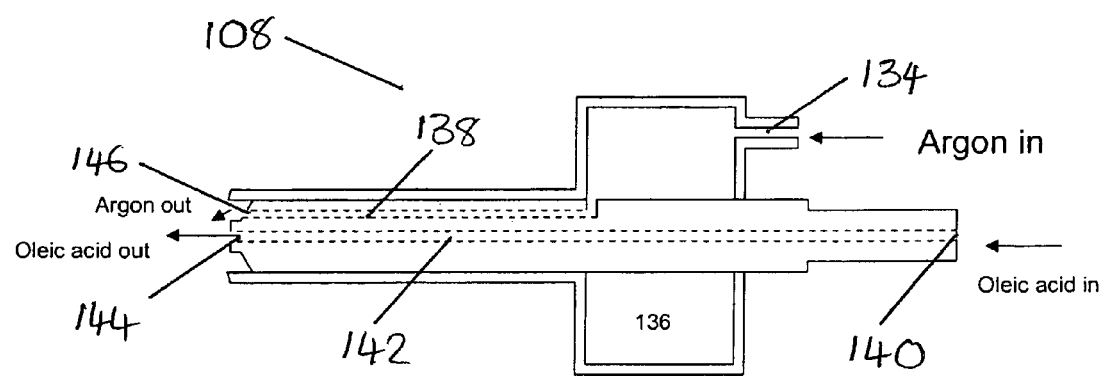
FIG. 5 is a schematic side elevation of a coating material atomiser.
Figure 6:
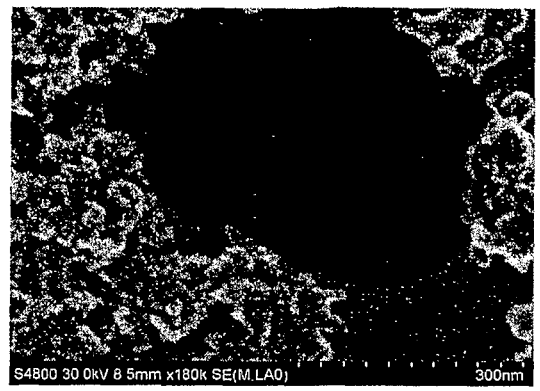
FIG. 6 is a SEM image of fine copper particles with an oleic acid coating (180K)
Figure 7:
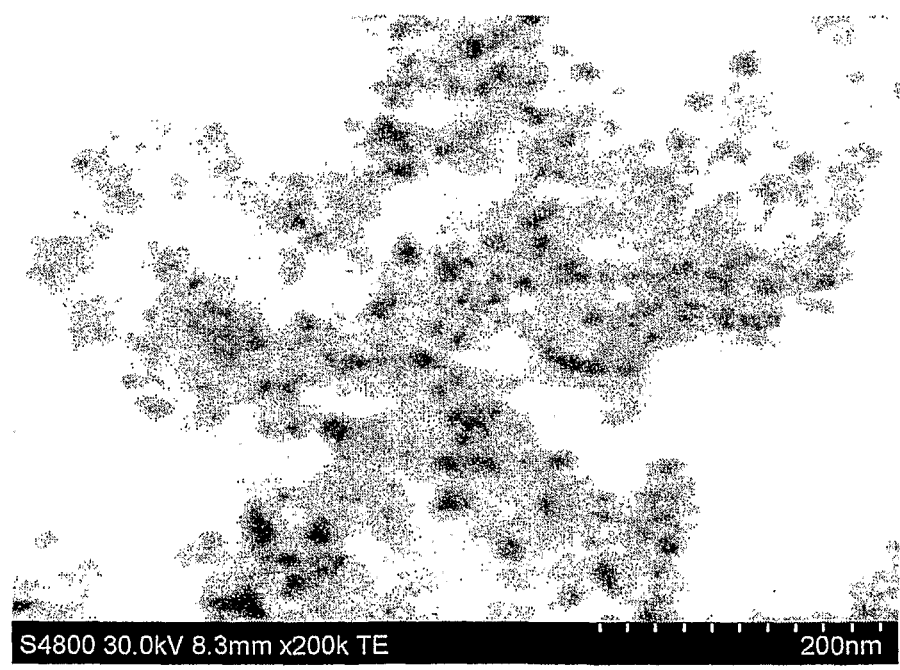
FIG. 7 is a STEM image of fine copper particles with an oleic acid coating (200K)
Figure 8:
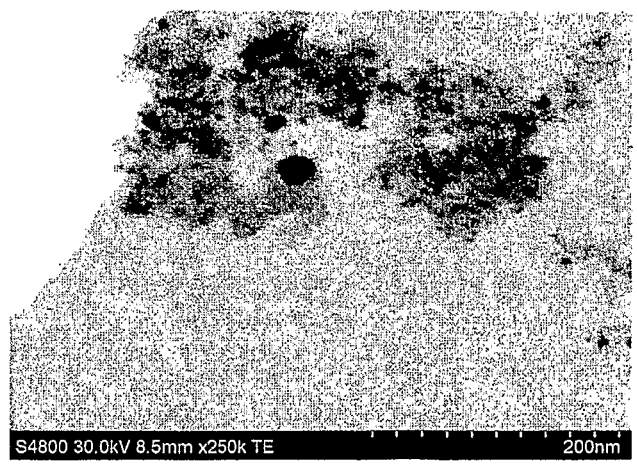
FIG. 8 is a STEM image of fine copper particles with an oleic acid coating (250K)
Figure 9:
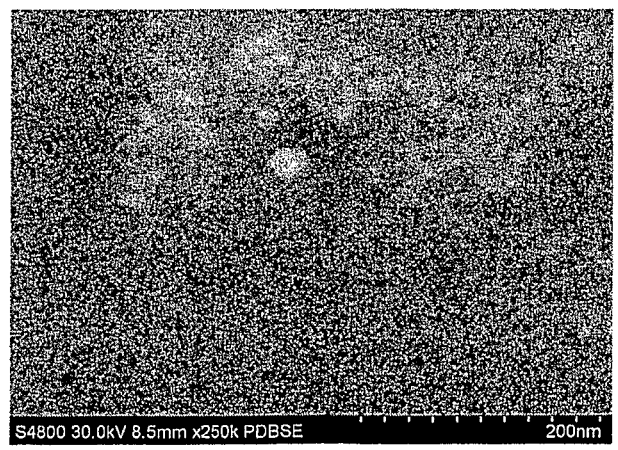
FIG. 9 is a backscattering image of the fine copper particles of FIG. 8.
Figure 10:
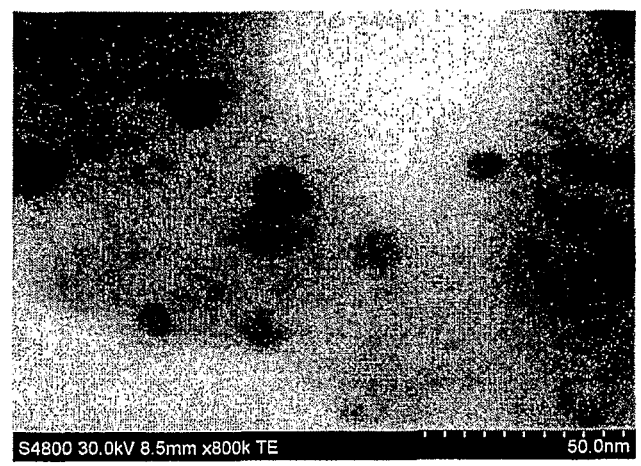
FIG. 10 is a STEM image of fine copper particles with an oleic acid coating (800K)

The oleic acid is transferred from the pressurising and heating apparatus to the atomiser 108 (FIG. 5). The atomiser 108 comprises a gas reservoir 136, in this embodiment the gas is argon. The heated oleic acid is pumped through the atomiser 108, out of the stainless steel nozzle 144 where it is atomised upon mixing with the argon carrier gas. The feed rate of the oleic acid in this embodiment is 605 ml/h.

In this embodiment argon enters the atomiser via a carrier gas inlet 134 and is stored in the gas reservoir 136 prior to mixing with the oleic acid. The oleic acid enters the atomiser via the coating material inlet 140 from the pressurising and heating apparatus 110. The organic fluid passes through the atomiser via passage 142 to the nozzle 144. The argon exits the gas reservoir through a different exit point 146 in the nozzle 144 at which point it atomises the oleic acid.

The stream of oleic acid/argon is injected at an injection point 114 where the temperature is in the range 400° C.-700° C., injection is at the point about 5° C. lower than the decomposition point of oleic acid. Injection occurs at about 5 milliseconds of copper particle formation. The stream of oleic acid/argon does not contact plasma torch 102.

The fine particles of copper coated with oleic acid then pass through the injection zone 106, into the cooling and collection chambers 112. The resulting product is a fine powder of unsintered, un-agglomerate particles.

In embodiments where the coating material is liquid, the fine copper particles then flow into the coating chamber 206 where they are bubbled through the coating solution at a rate of 50 liters/minute (the main flow is typically 1,500 to 2,000 liters/minute) and at a pressure of 100 millibar gauge overpressure. Flow rate is controlled using control valve 228, excess gas and core material being diverted directly to a gas recovery stack 232 via bypass conduit 230. Bypass conduit 230 also functions to allow pressure relief in the event that the route to the coating chamber 206 becomes blocked.

The fine particles of copper coated with oleic acid are then collected using filtration, washed with water to ensure that all of the non-adhered coating material is removed from the coated particles and dried using conventional techniques. The resulting product is a fine powder of unsintered, un-agglomerate particles.

In optional embodiments, the carrier gas is retrieved and dried using recovery stack 232. The gas which is retrieved may pass to the recovery stack 232 directly from the expansion chamber 204 via bypass conduit 230 (in which case the uncoated copper fine particles are filtered off before the gas is recovered), or from the coating chamber 206 (in which case the gas is retrieved via outlet 234). In this example the gas is drawn from the coating chamber 206 using a pump (not shown). The gas may be dried, for instance over molecular sieves, prior to reuse.

In some embodiments, bypass conduit 230 will be absent, and the whole gas stream carrying the particles may only flow via the coating chamber 206.

Those skilled in the art will understand that the rates of coolant, bubbling, particle and gas flow may be scaled to increase or decrease the yield to be obtained, without departing from the scope of the invention. Further, in embodiments where the core and coating materials are other than copper and oleic acid, the various flow rates described above may be changed as appropriate for the substrates being used; as would be understood by the person skilled in the art.

Analytical Techniques

The SEM and STEM (cold field emission scanning STEM) images were obtained at the stated temperatures using a Hitachi S-4800 Ultra-high resolution FE-SEM (resolution to 0.6 nm). The images were obtained under low pressure vacuum.

The XRD data was obtained using a Brucker D500 defractometer at 27° C. using a step interval of 0.020° and a step time of 4 seconds. The angle range 25.0°-95.0° was swept in each instance.

Example 1

Synthesis of Fine Particles Using Injection Techniques

Powdered copper was injected into the apparatus of FIG. 1 through an alumina ring.

Oleic acid was warmed to about 50° C. and injected into the apparatus in a stream of argon. Heating the oleic acid reduced its viscosity. The acid was injected into the plasma stream at a flow rate of 25 ml/minute just above the quench ring, where the temperature was high enough to vaporise the acid, but low enough that decomposition would not occur.

After collection of the fine particles the reactor was cooled and inspected. This inspection showed that clean vaporisation of the core material had occurred and that there was no deposition of the core material on the walls of the chamber. This was attributed to the powder injection through the alumina ring. Whilst some deposition of the fine particles was observed on the filter elements, this could be removed and recovered using water or isopropanol. The recovery of agglomerated or sintered particles would require additional techniques, such as the application of ultrasound to the solvent and possibly also physical agitation.

The fine particles produced are of size in the range about 10-50 nm. Dispersions of the fine particles were stable in acetone and in ethyl acetate for at least 2 months.

Example 2

Characterisation of the Fine Particles of FIG. 1

SEM and STEM images were recorded for copper fine particles produced using the apparatus of FIG. 1 with and without an oleic acid coating.

In SEM an electron beam scans a surface and reproduces the image measured at the detector (for back-scattered (elastic) or secondary electrons, also X-rays which can give chemical mapping of the surface) onto a screen scanned in the same manner, to give a surface image at higher magnification than is possible using the frequency of light. STEM is a modification of SEM, where the apparatus is fitted with a second detector below the sample stage so that it may also be used to collect and detect electrons that pass through the sample, making it a Transmission Electron Microscope (TEM) for such samples as are sufficiently thin or which pose low resistance to the electrons for any to pass through to the detector.

Figure 11:
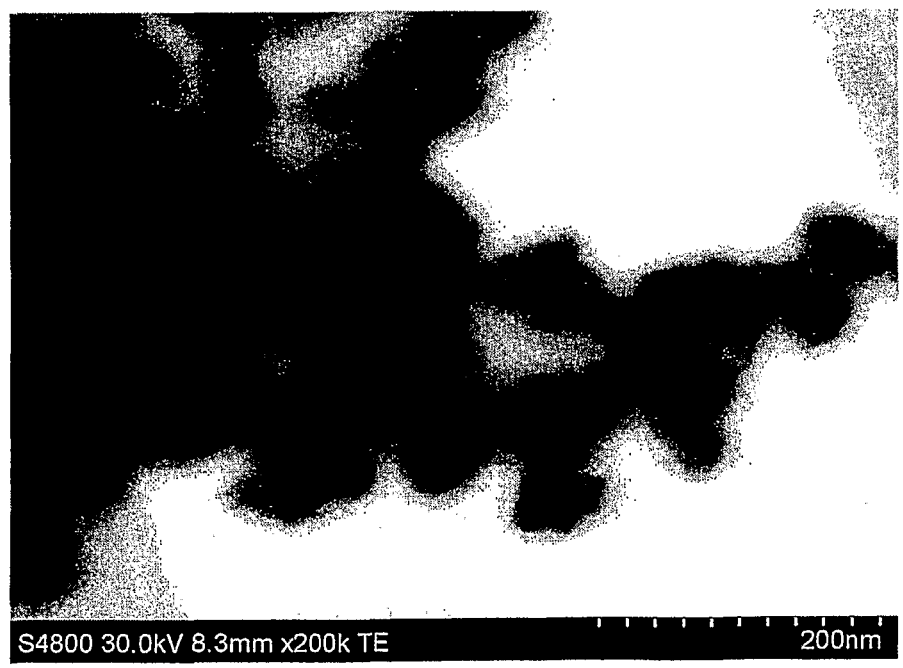
FIG. 11 is a SEM image of uncoated fine copper particles (200K)
Figure 12:
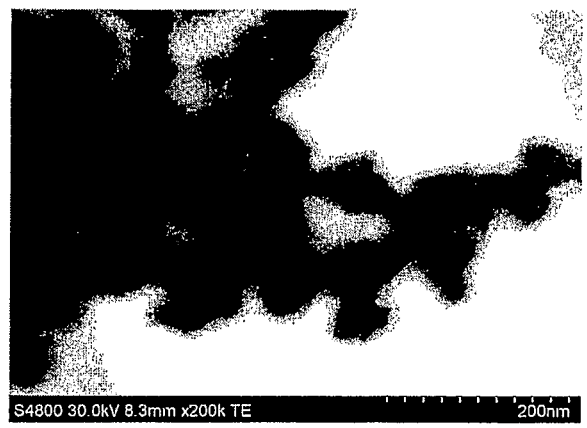
FIG. 12 is an STEM image of uncoated fine copper particles (200K)

The images with the coating (FIGS. 6 to 10) show copper nanoparticles which are un-agglomerated and un-sintered as can be seen by the presence of distinctive black dots (the copper core) surrounded by a thin layer of a light grey material (the oleic acid coating). This is not observed with the uncoated particles (FIGS. 11 and 12).

Figure 13:
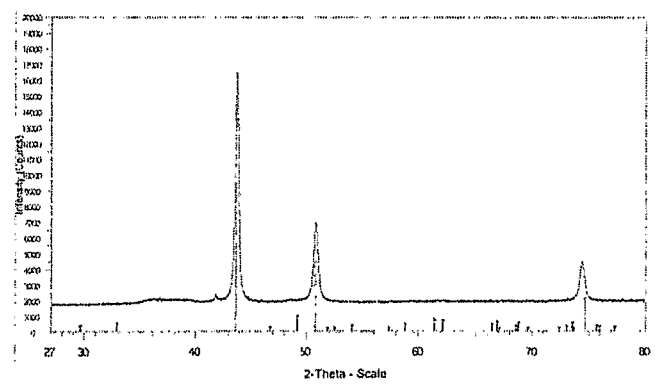
FIG. 13 is an XRD image of uncoated fine copper particles.
Figure 14:
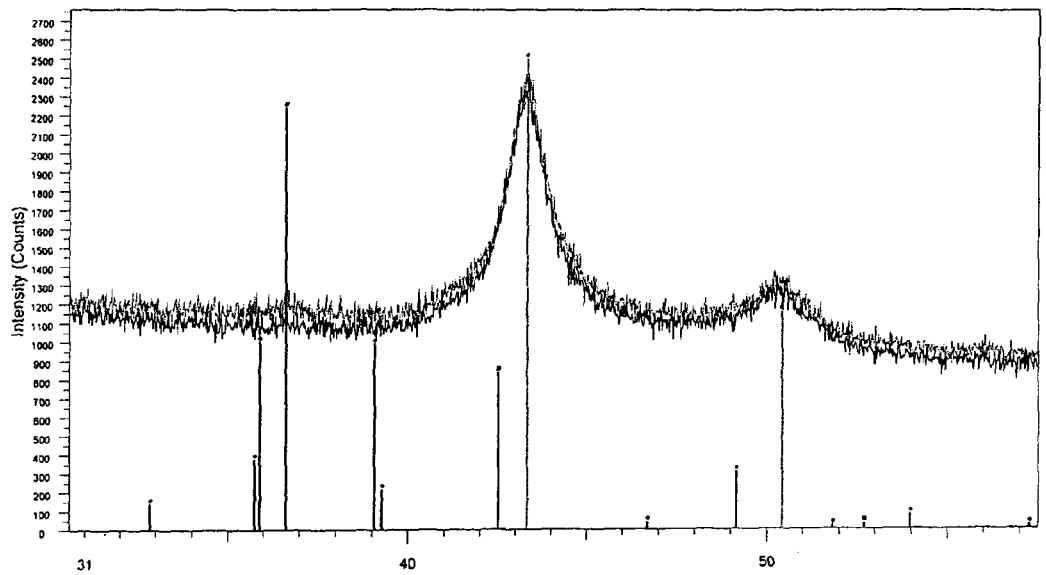
FIG. 14 is an XRD of fine copper particles with an oleic acid coating taken just after preparation of the particles and again after 30 days.

XRD images of copper fine particles with and without the oleic acid coating are also shown (FIGS. 13 and 14). In XRD X-rays are directed at a surface at a range of angles, and the resulting diffracted X-rays are detected and plotted versus angle on a graph to show what materials are present, giving a chemical analysis of the surface. FIGS. 13 and 14 show that Cu(0) remains in the coated particles. Sintering of the fine particles occurs at 215° C.

Example 3

Protection of Core Material from Oxidation

Two XRD spectra were run on a copper core coated with oleic acid. These are shown in FIG. 14 (day 0—black, day 30—grey). As can be seen, the oxidation of the copper is negligible as the height of the Cu(0) peak has not varied. Accordingly, the oleic acid coating has protected the copper core from oxidation.

Figure 15:
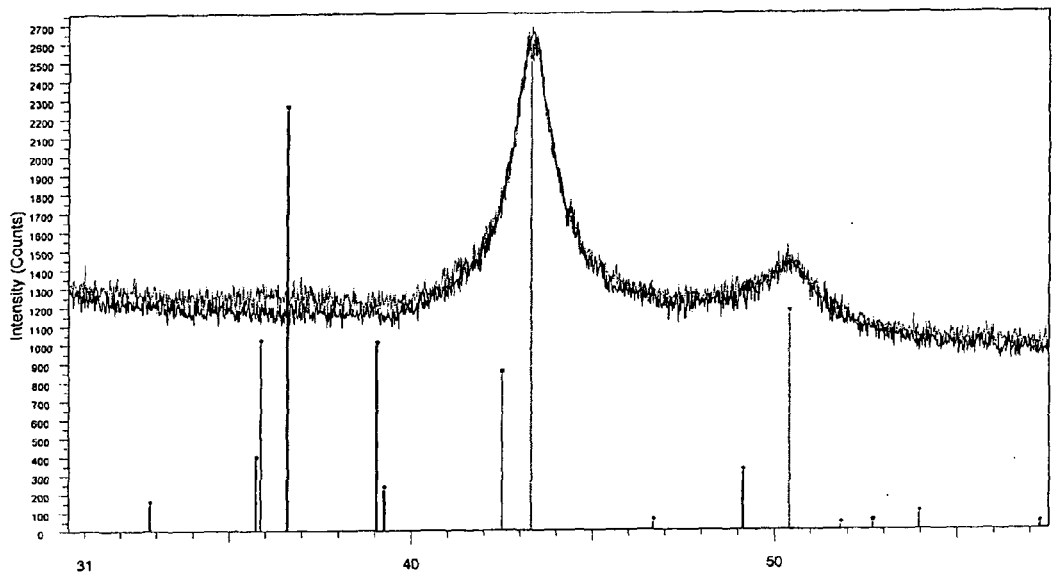
FIG. 15 is an XRD of fine copper particles with a PVP coating taken just after preparation of the particles and again after 30 days.

FIG. 15 shows two XRD spectra run on a copper core coated with PVP (day 0—black, day 30—grey). As with the oleic acid core above, the height of the Cu(0) peak has not varied, and hence the copper core has been protected from oxidation by the PVP coating.

Example 4

Synthesis of Fine Particles

Powdered copper sized between 1 and 10 micrometers was injected into the apparatus of FIG. 1 through an alumina ring. The resulting nanoparticles were then passed on a stream of argon into the coating chamber where they were bubbled through liquid oleic acid (10-20 millibar gauge) and at a rate of between 100 to 500 milliliters/minute. The coated fine particles were then collected, washed with water to remove any unbound oleic acid and dried.

It was noted that clean vaporisation of the core material had occurred and that there was no deposition of the core material on the walls of the chamber. This was attributed to the powder injection through the alumina ring. Whilst some deposition of the fine particles was observed on the filter elements, this could be removed and recovered using water or isopropanol. The recovery of agglomerated or sintered particles would require additional techniques, such as the application of ultrasound to the solvent and possibly also physical agitation.

The fine particles produced are of size in the range about 10-50 nm. Dispersions of the fine particles were stable in acetone and in ethyl acetate for at least 2 months.

Example 5

Characterisation of the Fine Particles of Example 4

Figure 18:
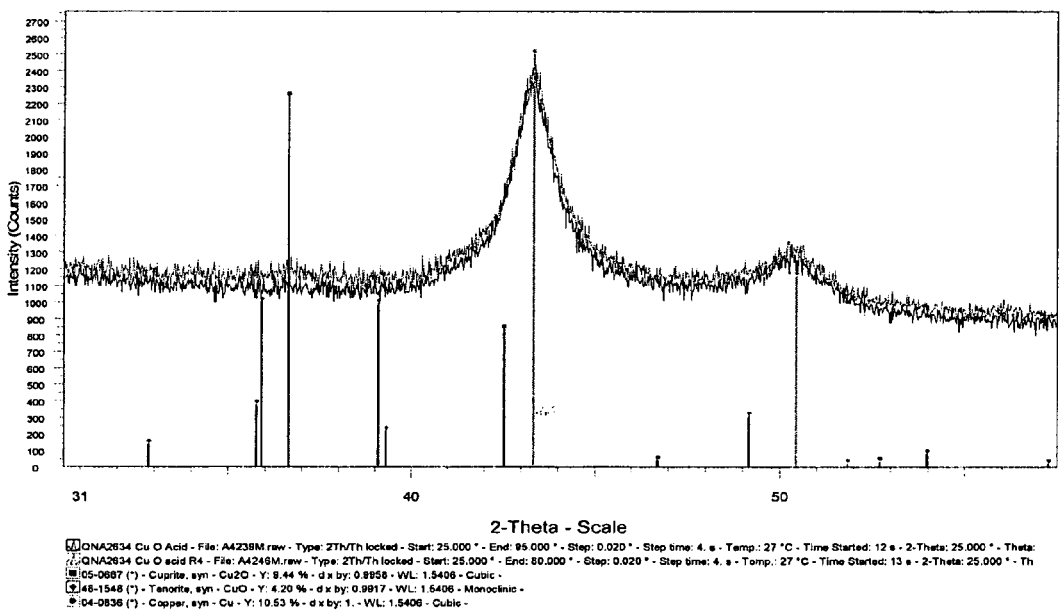
FIG. 18 is an XRD of copper nanoparticles coated in oleic acid using the process of the invention.

The XRD image shown in FIG. 18, includes two traces, each with a major peak (copper) just above 43, and a secondary peak (copper) just above 50 on the 2-Theta scale. The upper trace is of the oleic acid coated copper nanoparticles 30 days after formation, the lower trace is of the nanoparticles directly after synthesis. The similarity between these images, in particular the lack of copper oxide peaks appearing at around 33, 36, 37, 39, 42 and 49 on the 2-Theta scale shows that the coated particles remain oxide-free for at least 30 days.

Figure 19:
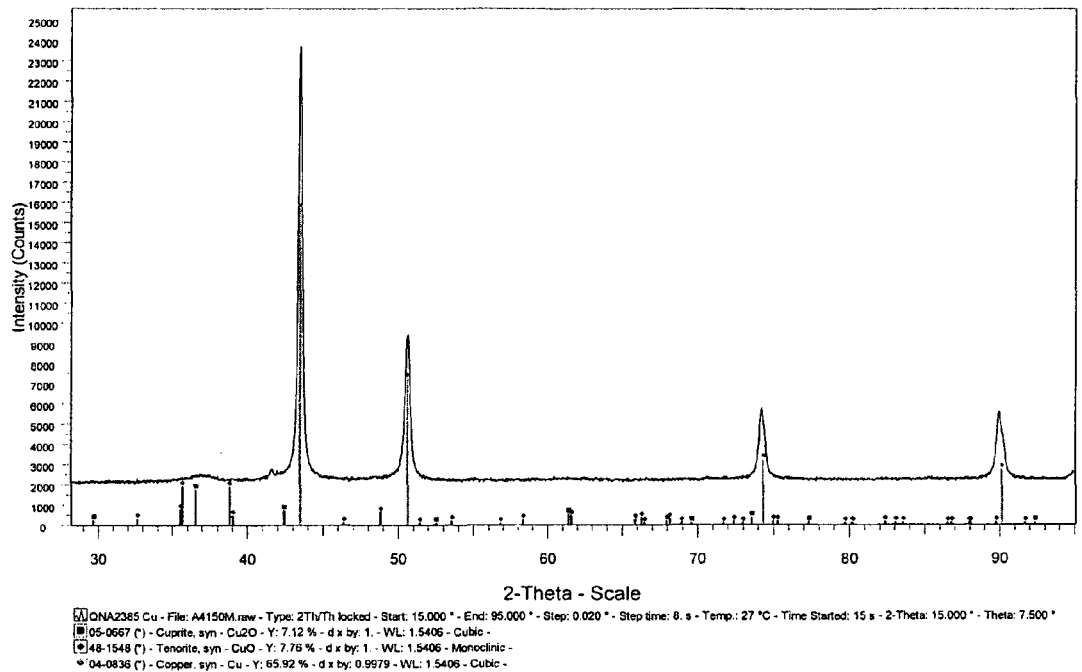
FIG. 19 is an XRD of uncoated copper nanoparticles sampled directly after nanoparticle synthesis.
Figure 20:
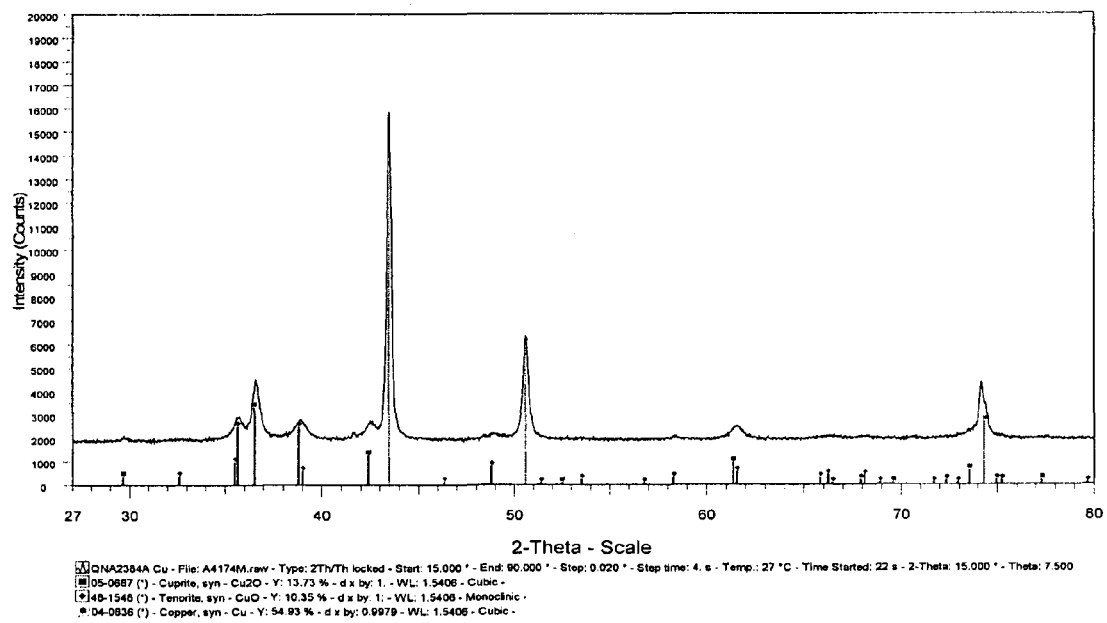
FIG. 20 is an XRD of uncoated copper nanoparticles sampled after being exposed to air for 24 hours after nanoparticle synthesis.

This result can be compared with FIG. 19 (uncoated copper nanoparticles observed directly after synthesis) and FIG. 20 (uncoated copper nanoparticles after 24 hours of exposure to air). FIG. 20 clearly shows the presence of copper oxide peaks, indicating that without the protection of the coating, significant oxidation of the copper nanoparticles will take place over a short time.

Figure 21:
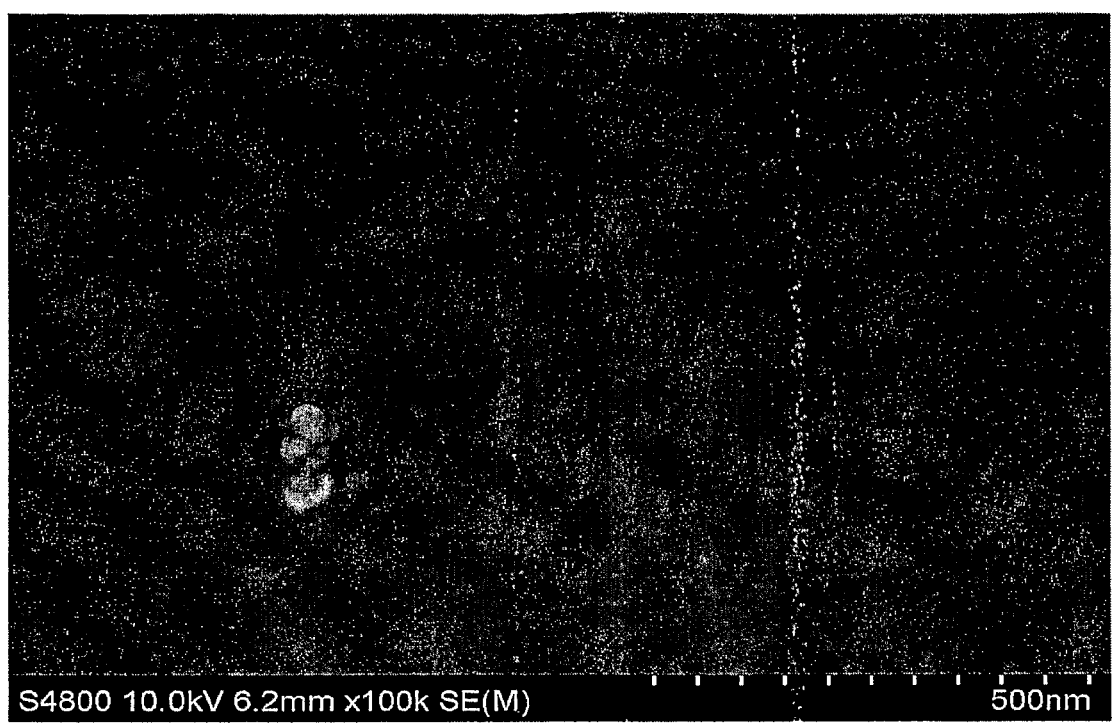
FIG. 21 is an SEM image of the coated copper nanoparticles of FIG. 18 observed at 100K.
Figure 22:
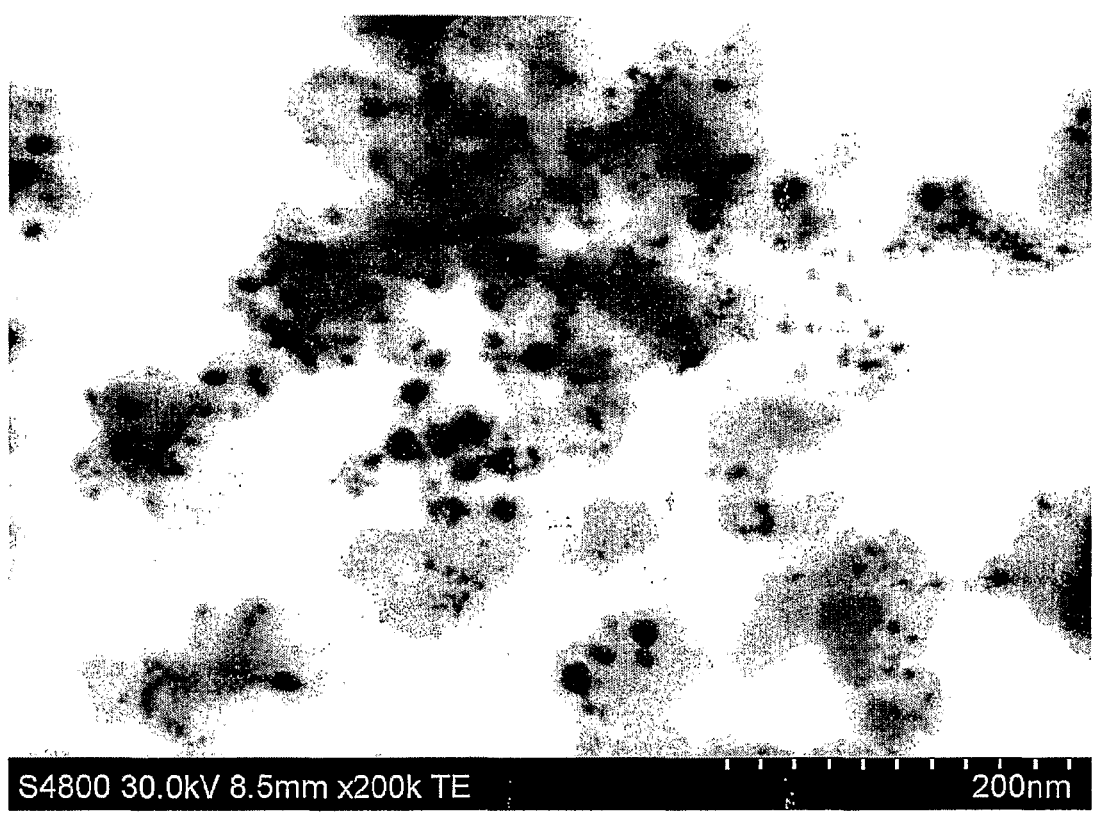
FIG. 22 is an STEM image of the coated copper nanoparticles of FIG. 18 observed at 200K.
Figure 23:
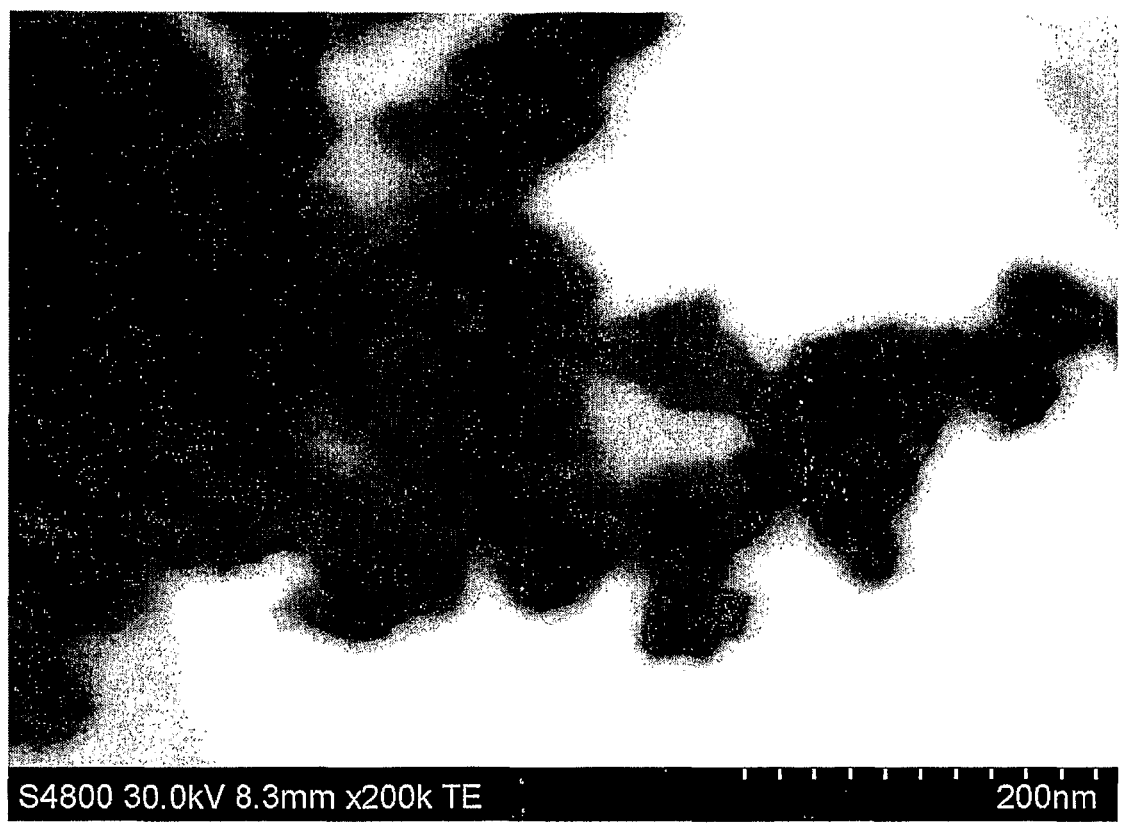
FIG. 23 is an STEM image of uncoated copper nanoparticles observed at 200K.

SEM and STEM images, FIGS. 21 and 22, clearly show that the coated nanoparticles of the invention are completely unagglomerated, this is contrasted with the uncoated particles of FIG. 23 which are clearly sintered.

Accordingly, the nanoparticles produced by the process of the invention have been shown to be unagglomerated and stable to oxidation over time.

The invention claimed is:

1. A process for the formation of substantially oxide-free fine particles comprising a core and a coating, wherein the coating comprises one or more polymeric compounds; the process comprising: introducing a core material into a plasma stream thereby vaporising some or all of the core material; cooling the core material downstream from where the core material was introduced, thereby creating particles of the core material; injecting the polymeric compounds into an injection zone; and coating particles of the core material with the polymeric compounds in the injection zone; wherein the polymeric compounds are injected in an inert gas stream into the injection zone at the closest proximity within the plasma stream to the point of formation of the core material where the temperature is below the decomposition/pyrolysis point of the coating material, and wherein the injection zone is downstream of a region where the particles of core material are formed.

2. A process according to claim 1 wherein coating occurs after the particles of core material have been formed.

3. A process according to claim 1 wherein the polymeric compounds are optionally heated prior to injection.

4. A process according to claim 1 wherein the coating occurs in a part of the injection zone which is at a temperature slightly below the temperature where the polymeric compounds would decompose or pyrolyse.

5. A process according to claim 1 wherein the polymeric compounds form a monolayer coating.

6. A process according to claim 1, wherein the fine particles are less than 20 nanometers in diameter.

7. A process according to claim 1 comprising the fine particles having a surface of a single polarity.

8. A process according to claim 1, wherein the fine particle additionally comprises argon, hydrogen or helium residue; and/or wherein the core is selected from a metal, metalloid, metal oxide or combination thereof.

9. A process according to claim 8 wherein the metal comprises a transition metal selected from the group consisting of iron, nickel, copper, zinc, palladium, silver, cadmium, gold and alloys thereof.

10. A process according to claim 1 wherein the coating is removable.

11. A process according to claim 1, wherein the polymeric compounds comprise a pyrrolidone.

\* \* \* \* \*